United States Patent [19]

Kaimai et al.

[11] 4,405,955
[45] Sep. 20, 1983

[54] VIDEO SIGNAL REPRODUCING APPARATUS

[75] Inventors: Hiroyuki Kaimai, Kawasaki; Masakazu Sonoda, Urawa; Masaaki Komatsu, Tokyo; Atsuo Sakai, Tokyo; Toshimitsu Kamai, Higashikurume, all of Japan

[73] Assignee: Sony Corporation, Tokyo, Japan

[21] Appl. No.: 269,428

[22] Filed: Jun. 1, 1981

[30] Foreign Application Priority Data

Jun. 4, 1980 [JP] Japan .................................. 55-75299

[51] Int. Cl.³ ............................................. H04N 5/783
[52] U.S. Cl. .................................................. 360/10.3
[58] Field of Search .................... 360/10.1, 10.3, 11.1, 360/33.1, 21, 64, 7; 358/312; 360/30, 9.1, 37.1

[56] References Cited

U.S. PATENT DOCUMENTS

| | | | |
|---|---|---|---|
| 3,678,186 | 7/1972 | Narita | 360/70 |
| 4,197,562 | 4/1980 | Kikuya | 360/10.3 |
| 4,283,737 | 8/1981 | Nikami | 358/312 |
| 4,293,880 | 10/1981 | Tsukada | 360/64 |

Primary Examiner—Alan Faber

Attorney, Agent, or Firm—Lewis H. Eslinger; Alvin Sinderbrand

[57] ABSTRACT

In an apparatus for reproducing video signals recorded in successive parallel tracks extending at an angle to the lengthwise direction of a tape and wherein two main reproducing heads having different azimuth angles with respect to each other are arranged to be diametrically opposed and alternately reproduce the video signals from the tracks when the tape is transported lengthwise at a standard speed, and an auxiliary reproducing head having the same azimuth angle as one of the main reproducing heads is circumferentially displaced by (n+0.25)H' from another of the main reproducing heads where n is zero or a positive integer and H' is an angle corresponding to one horizontal scan line on the tape, from the auxiliary reproducing head and reproduces the video signals in cooperation with one of the main reproducing heads when the tape is stopped and delay control means for alternately delaying the reproduced video signal from one of the main reproducing heads and the video signal from the auxiliary reproducing head by an amount corresponding to a break in the continuity of the horizontal synchronizing pulses which occurs in synchronism with the changing of the reproduction of said video signals by the one of the main reproducing heads and auxiliary reproducing head.

8 Claims, 25 Drawing Figures

FIG. 10A (IN)
FIG. 10B (OUT)
FIG. 10C (PG2)

FIG. 11A (IN)
FIG. 11B (OUT)
FIG. 11C (PG1)

F I G. 12

VIDEO SIGNAL REPRODUCING APPARATUS

BACKGROUND OF THE INVENTION

1. Field of the Invention

This invention relates generally to a video signal reproducing apparatus, and more particularly, to improvements in such apparatus for avoiding skew distortion when reproducing is effected when the magnetic tape or other record medium is stopped.

2. Description of the Prior Art

In a conventional video tape recorder (VTR), two transducers or heads are provided having air gaps with different azimuth angles for recording and reproducing signals in the next adjacent or alternate tracks, respectively, in order to minimize cross-talk while permitting an increase in the recording density. This is relatively easy to do, because an apparatus for magnetically recording and/or reproducing video signals frequently includes a rotary guide drum provided with two alternately operative transducers or heads which are diametrically opposed and which can have air gaps with different azimuth angles. The magnetic tape is wrapped helically about a portion of the perimeter of the guide drum and is moved longitudinally while the transducers or heads are rotated, thus causing the heads alternately to scan respective tracks on the tape for recording or reproducing signals recorded therein. In the recording operation of the foregoing helical scan type VTR (video tape recorder), each head effects magnetization of magnetic domains in the magnetic coating on the tape in what would appear to be, if such domains were visible, a series of parallel lines or stripes each having a length as great as the width of the track, and each having an orientation that corresponds to the azimuth angle of the gap of the respective transducer or head. In the reproducing or playback operation of the apparatus, each track is scanned by the transducer or head having its gap aligned with the parallel, but fictitious, lines of that track, from which it follows that the gap of the transducer or head scanning a track for reproducing the video signals recorded therein extends at an angle to the aforementioned fictitious lines of the tracks next adjacent to the track being scanned. By reason of the foregoing, if a transducer or head, in scanning a track for reproducing the video signals recorded therein, overlaps a next adjacent track or otherwise reproduces signals recorded in a latter, the well-known azimuth loss will result in attenuation of the cross-talk signal reproduced from the next adjacent track.

Further, it is the usual practice to record video signals with so-called H-alignment so as to avoid interference or cross-talk from the horizontal synchronizing and blanking signals included in the video signals recorded in the successive parallel tracks. In recording video signals with H-alignment, the ends of the margins between the successive areas in which line intervals are recorded in each track are aligned, (in the direction transverse to the lengths of the tracks), with the adjacent ends of the margins between the successive areas in which line intervals are recorded in the next adjacent tracks.

If, during reproducing operation of the helical scan type VTR, the speed and direction of movement of the tape are equal to the standard type speed and direction, respectively, for recording, then the scanning path of each rotary head or transducer can be made to accurately coincide with a respective one of the record tracks for properly reproducing the video signals recorded therein, and the above described measures are effective for substantially eliminating cross-talk in respect to signals recorded in the tracks next adjacent the track being scanned.

Generally, in practical embodiments of the helical scan type VTR, the standard tape speed for recording is conveniently selected in relation to the diametrical size of the guide drum so that the video signals are recorded with the H-alignment in the nearest to each other tracks recorded by the same head. However, it is sometimes required that during recording the magnetic tape is moved with different tape speeds other than the standard tape speed for increasing the recording density of the video signal thereon. Then, it is not possible to provide an apparatus in which the video signals are recorded with H-alignment when the tape is advanced at two or more different speeds. For example, if the video signals are recorded with H-alignment when the tape is longitudinally driven or transported at a predetermined speed, the signals will not be recorded with H-alignment when the tape is transported at one-half such predetermined speed.

Now, if the tape speed during reproducing is substantially different from that for recording, or if the direction of tape movement during reproducing is different from that during recording, the scanning path of each head may be at a sufficiently large angle to the direction along the recorded tracks so that, in traversing such scanning path, each head will move along, and reproduce video signals from first one and then another of the nearby tracks which have the positions of the recorded horizontal synchronizing pulses offset, for example, by $\frac{1}{2}$ the horizontal period (H). If such signals reproduced from first one track and then another during a single field interval are demodulated and fed to a television receiver, a disturbance or jump of $\frac{1}{2}$H occurs in the continuity of the horizontal synchronizing pulses at the change over of the reproducing head or transducer from one track to the other. During the scanning period in which the automatic frequency control (AFC) circuit of the television receiver absorbs the jump of $\frac{1}{2}$H, a skew distortion will appear in the reproduced picture.

In order to avoid the skew distortion of the reproduced picture, there has been already proposed a new circuit arrangement by the same applicant in U.S. patent application Ser. No. 078,774 filed Sept. 25, 1979, now U.S. Pat. No. 4,283,737, in which the reproduced video signals are delayed by an amount corresponding to the offset distance between the horizontal synchronizing pulses recorded in nearby tracks, and when operating with such different reproducing speed, a switching circuit alternately provides the video signals as reproduced by the head and the delayed reproduced video signals, respectively, with the state of the switching circuit being changed-over each time the reproducing head, in moving along the scanning path, moves from one to the other of the nearby tracks.

On the other hand, there is another type of VTR, in which there are at least two main rotary heads having different azimuth angles to each other and an auxiliary rotary head having the same azimuth angle as that of one of the main rotary heads and which is disposed to substantially scan the same track as scanned by one of the main rotary heads. For slow motion reproduction of the recorded video signals, the tape is intermittently driven by tracks of one frame at every predetermined time interval corresponding to the slow motion ratio, and when the tape is stopped, the video signals are alternately reproduced by one of the main rotary heads and the auxiliary rotary head, while the video signals are alternately reproduced by the two main rotary heads while the tape is moving.

When the above delay circuit arrangement is applied to the new type of VTR described above, the delay circuit arrangement itself becomes complicated and it becomes difficult to control the delay circuit.

OBJECTS AND SUMMARY OF THE INVENTION

Accordingly, it is an object of the present invention to provide a video signal reproducing apparatus which is free of the above mentioned problems burdening the prior art.

More particularly, it is an object of this invention to provide a video signal reproducing apparatus with a relatively simple circuit arrangement for avoiding skew distortion of a reproduced picture when the reproducing operation is carried out with the tape speed and/or direction being different from that employed for recording.

According to an aspect of the present invention, an apparatus for reproducing video signals recorded in successive parallel tracks extending at an angle to the length of a tape is provided, which comprises:
two main reproducing heads having different azimuth angles with respect to each other and disposed diametrically opposite each other;
at least one auxiliary reproducing head having the same azimuth angle as one of the main reproducing heads, said auxiliary reproducing head being disposed to be circumferentially displaced by $(n+0.25)H'$ where n is zero or a positive integer and, $H'$ is an angle corresponding to one horizontal scan track on the tape from another of the main reproducing heads;
head control means for controlling said main and auxiliary reproducing heads so as to reproduce the video signals with said main reproducing heads when the tape is transported lengthwise at a standard speed and to reproduce the latter signals with said one of said main reproducing heads and said auxiliary reproducing head when the tape is stopped; and
delay control means for alternately providing the reproduced video signal and the latter signal delayed by an amount corresponding to the jumping of the horizontal synchronizing pulses which occurs in synchronism with the change-over between one of the main reproducing heads and the auxiliary reproducing head.

The other objects, features and advantages of the present invention will become apparent from the following description taken in conjunction with the accompanying drawings through which like references designate the same elements and parts.

BRIEF DESCRIPTION OF THE DRAWINGS

FIGS. 2A through 3C are diagrams showing respective record patterns of H-alignment and no H-alignment and used to explain the jumping of the horizontal synchronizing signals upon a still reproduction mode;

FIGS. 7A through 8B are diagrams respectively showing record patterns of H-alignment no H-alignment and used to explain the jumping of the horizontal synchronizing signals upon a still reproduction mode;

FIGS. 10A through 11C are time charts used to explain the operation of the circuit shown in FIG. 9.

DESCRIPTION OF THE PREFERRED EMBODIMENTS

Figure 1:
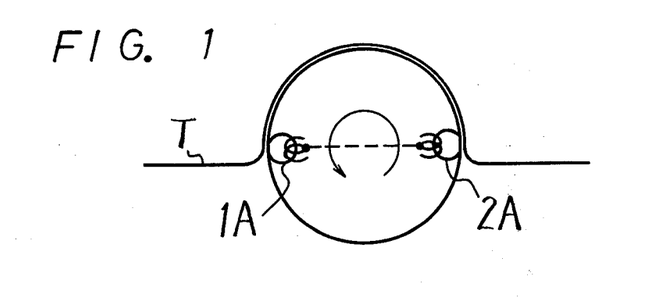
FIG. 1 is a plan view showing a prior art rotary head assembly in which the heads are disposed with an angular distance of 180° therebetween.

For easy understanding of the present invention, the still motion reproduction which is carried out by a pair of diametrically opposed rotary heads is initially explained with reference to FIGS. 1 and 2. It will be seen in FIGS. 1 and 2 that a tape T is continuously advanced or driven at a standard speed in the direction of the arrow a and a pair of rotary heads 1A and 2A are rotated to cause the heads to alternately scan obliquely across the tape T in the direction of the arrow b on FIG. 2B, then such heads 1A and 2A can alternately record video signals in parallel record tracks Ai and Bi, respectively, which are skewed or arranged at a predetermined angle with respect to the longitudinal direction of tape T. In the example shown on FIG. 2, the standard tape speed for recording is selected so that the adjacent record tracks Ai and Bi will abut along their longitudinal margins, that is, guard bands between the tracks are eliminated, for achieving a high density of recording of the video signals on magnetic tape T. In the case of the recording of NTSC video signals comprised of 30 frames per second, the diametrically opposed heads 1A and 2A are conventionally rotated at a speed of 30 revolutions per second so that each of the heads will record a field of video signal information while scanning across tape T. In other words, odd-numbered fields of the video signals may be recorded in the tracks Ai recorded by head 1A having its gap at an azimuth angle slanting toward the left with respect to the direction across the respective track, and even-numbered fields of the video signals are recorded in the tracks Bi recorded by head 2A having its gap at an azimuth angle slanting toward the right.

Further, as is conventional in the recording of NTSC video signals, the field recorded in each of the tracks Ai and Bi includes $262\frac{1}{2}$ lines or horizontal periods of video information. In other words, the odd-numbered field recorded in each track Ai includes the video signal information for lines or horizontal periods (1)–(262) and the first half of line (263), while the even-numbered field recorded in each track Bi commences with the last half of line (263) and further contains lines (264)–(525). In order that the first and second halves of the 263rd horizontal period or line will be recorded in the odd- and even-numbered fields, respectively, the two adjacent tracks Ai and Bi are, at their ends longitudinally, displaced by a distance equivalent to $\frac{3}{4}$H, that is, $\frac{3}{4}$ of the distance along a track in which a horizontal line or period of the video signals is recorded. It will be apparent that, in the case where the positions at which recording commences in the next adjacent tracks Ai and Bi are shifted relative to each other by the distance ¾H in the direction along the tracks, the positions at which recording commences in nearby tracks recorded by means of the same head, for example, the tracks A1 and A2 recorded by head 1A, or the tracks B1 and B2 recorded by the head 2A, will be spaced from each other by the distance 1½H in the direction along the record tracks. By reason of the foregoing, and as shown on FIG. 2B, the positions at which the horizontal synchronizing pulses or signals of the video signals are recorded in each of the tracks A1 are offset or shifted by ½H in the direction along the tracks from the positions at which the horizontal synchronizing pulses or signals are recorded in the next nearest tracks Ai, that is, either the next earlier or the next later track recorded with the same head. Similarly, the positions at which the horizontal synchronizing pulses are recorded in each of the tracks Bi are offset by ½H with respect to the positions at which the horizontal synchronizing pulses are recorded in either the next earlier or next later track recorded by the same head 1B. In other words, the positions at which the corresponding horizontal synchronizing pulses or signals are recorded in the nearby tracks Ai, or in the nearby tracks Bi, are offset, in the direction along the tracks, by the distance nH+½H (in which n is a positive integer).

Figure 2A:
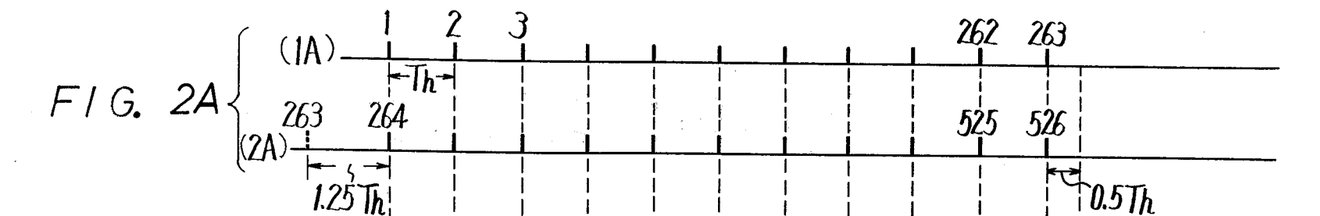
Figure 2B:
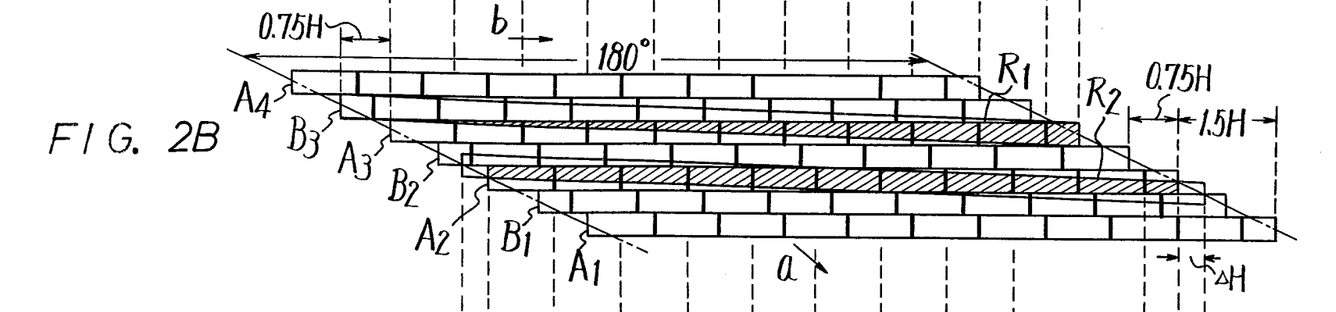

In the still motion reproducing operation of the helical scan type VTR with the tape T of the record pattern of FIG. 2B being stopped, the heads 1A and 2A scan the same reproducing trace, the inclination of which is different from that of the tracks Ai and Bi because of the tape T being stopped. As a result of the different inclinations therebetween, the level of the reproduced video signals will be dependent on the stop position of the tape T. FIG. 2B illustrates two cases. One case is such that both ends of a scan trace R₁ substantially coincide with one end of the track B3 and one end of the track A3, respectively, while the other case is such that the center portion of the track A2 overlaps the center portion of a scan trace R₂. In FIG. 2B, the regions from which reproduced outputs are derived are marked with a single-hatch. In this case, the scan trace R₂ is preferred since the reproduced output is high in level.

For simplicity of the explanation, assuming that the pair of rotary heads 1A and 2A have the same azimuth angle, the positions of the horizontal synchronizing signals obtained from the heads are indicated in FIG. 2B, in case that the heads 1A and 2A alternately scan the trace R₁.

At first, when the head 1A scans the track A3, as shown in FIG. 2A, the first to 263rd horizontal synchronizing signals are generated at every Th, respectively, corresponding to the first to 263rd horizontal periods. Next, the head 2A scans the same track A3, by which the 264th to 526th horizontal synchronizing signals are generated. Since the reproduced outputs by the heads 1A and 2A are continuously derived, the interval between the 263rd and 264th horizontal synchronizing signals becomes 1.25Th and hence a jump of 0.25Th is caused. Further, in such a case where after the head 2A scans the track, the head 1A scans the same track, a jump of 0.25Th is also caused.

Figure 2C:
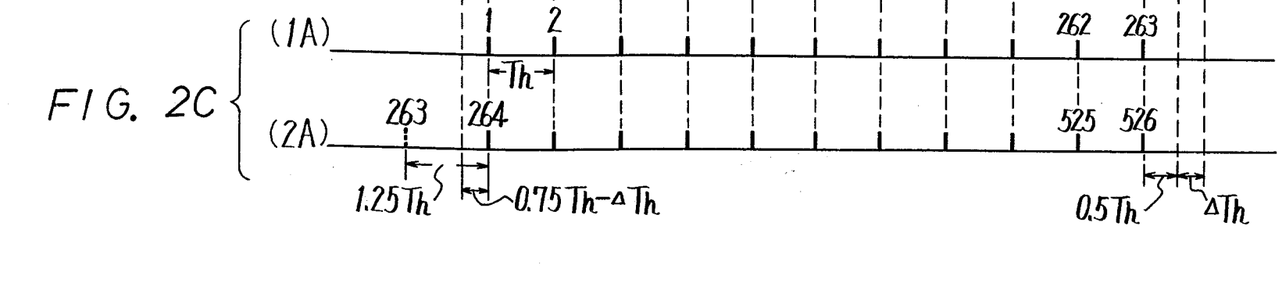

Also, in such a still reproduction mode where the heads 1A and 2A alternately scan the track A2 along the scan trace R₂, a jump of 0.25Th is similarly created, as will be apparent from FIG. 2C.

Figure 3A:
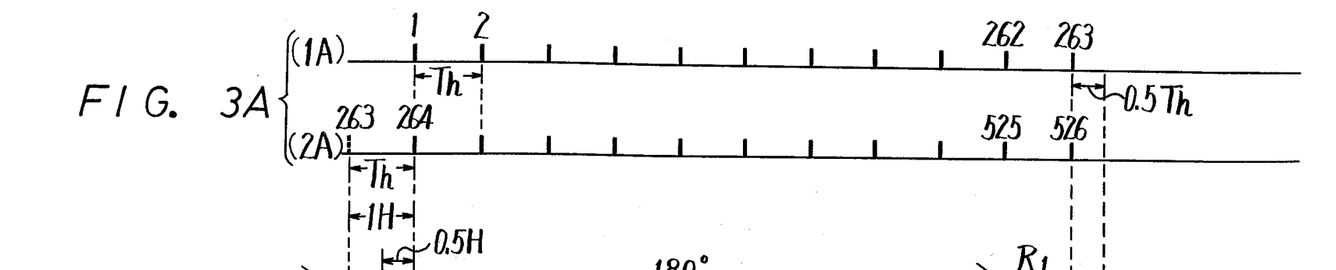
Figure 3B:
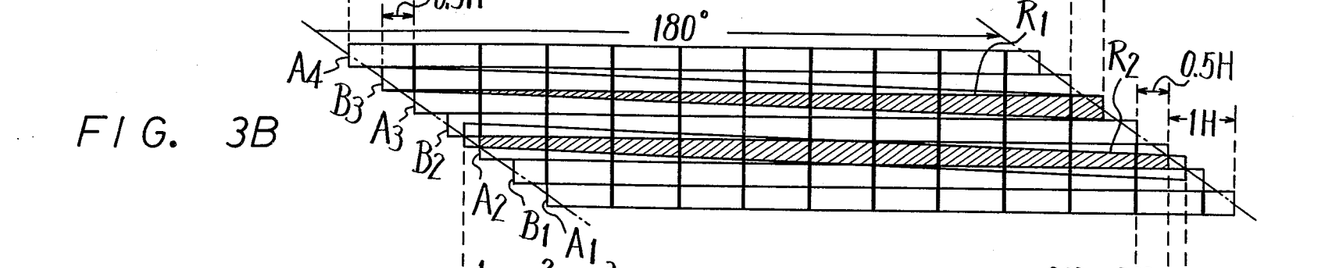
Figure 3C:
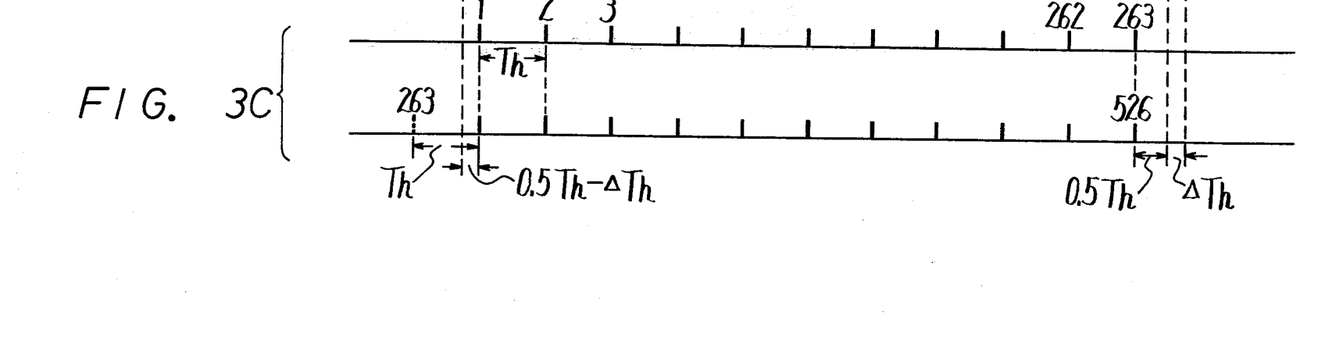

In the case where the running speed of the tape is selected to be ⅔ that of the standard speed in the same VTR, a record pattern of H-alignment is formed as shown in FIG. 3B. It is herein noted that, although the track pitch of FIG. 3B is narrower than that of FIG. 2B, in FIG. 3B, the tracks ae shown with the same pitch as that of the former for the sake of brevity. When the heads 1A and 2A scan sequentially such record pattern along the trace R₁, a reproduced output can be derived from the hatched region of track A3 and hence the horizontal synchronizing signals with the time relation shown in FIG. 3A are generated. In other words, the distance between the 263rd and 264th horizontal synchronizing signals becomes 1Th and no jump is caused. This fact is also seen in FIG. 3C in the case where the heads 1A and 2A scan the track A2 of the record pattern along the scan trace R₂.

The generation of the jumping width 0.25Th in the case where no H-alignment is presented and the shift of (n+0.75)H as shown in FIG. 2B is similar to the case where the rotary heads 1A and 2A are apart from the angular distance of 180° by nH'.

Figure 4:
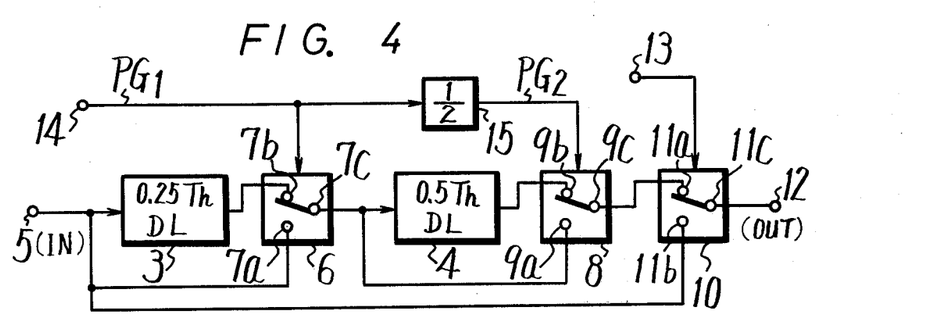
FIG. 4 is a block diagram showing a prior art jumping correction circuit.

FIG. 4 shows an example of the jumping correction circuit which will correct the above jumping. In FIG. 4, reference numeral 3 designates a delay circuit or line with the delay amount of 0.25Th and 4 a delay circuit or line with the delay amount of 0.5Th, respectively. The video signal which is reproduced by the heads 1A and 2A and then FM demodulated, is applied to an input terminal 5. The input video signal and the output from the delay line 3 are respectively fed to input terminals 7a and 7b of a change-over switch 6. The video signal appearing at an output terminal 7c of the switch 6 is fed to an input terminal 9a of a change-over switch 8 and also to its other input terminal 9b through the delay line 4. The video signal delivered to an output terminal 9c of the switch 8 is applied to an input terminal 11a of a mode change-over switch 10 which has another input terminal 11b supplied with the input video signal and an output terminal 11c connected with an output terminal 12. A mode change-over signal is fed from a terminal 13 to the mode change-over switch 10 to control it such that when the record pattern of FIG. 2B, in which no H-alignment is present, is still-reproduced, the input terminal 11a of the switch 10 is connected to its output terminal 11c, while when the record pattern of the H-alignment shown in FIG. 3B is still-reproduced, the input and output terminals 11b and 11c of the switch 10 are connected. That is, when the H-alignment is present in the record pattern, the jumping correction is unnecessary as set forth above. Therefore, in such a case, the reproduced video signal fed to input terminal 5 is delivered as it is to output terminal 12.

In the circuit of FIG. 4, a control pulse PG₁, which is provided from the detecting signal in synchronism with the rotary phase of the head, is applied to a terminal 14. The control pulse PG₁ is then fed to the change-over switch 6 to control it and also through a ½ frequency divider 15 to the change-over switch 8 as a control pulse PG₂ to control the same. In other words, the change-over switches 6 and 8 are so controlled that when the control pulses PG₁ and PG₂ are both "0" in level (low level), the input terminals 7a and 9a of the switches 6 and 8 are respectively connected to their output terminals 7c and 9c, while the control pulses PG₁ and PG₂ are both "1" in level (high level) the other input terminals 7b and 9b thereof are respectively connected to their output terminals 7c and 9c.

Figure 5A:
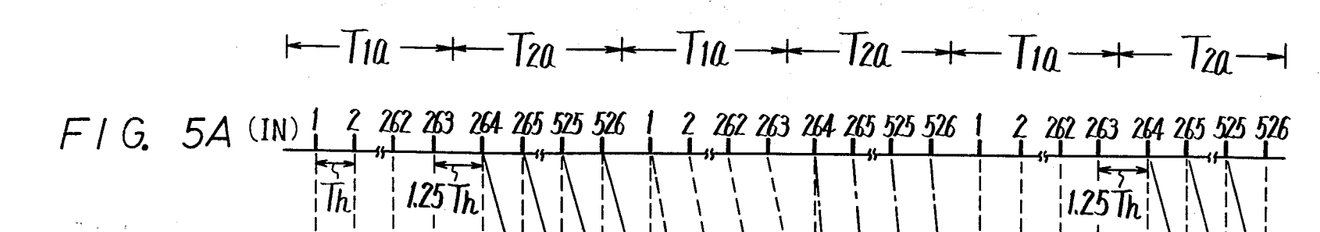
FIGS. 5A through 5D are time charts used to explain the operation of the circuit shown in FIG. 4.
Figure 5B:
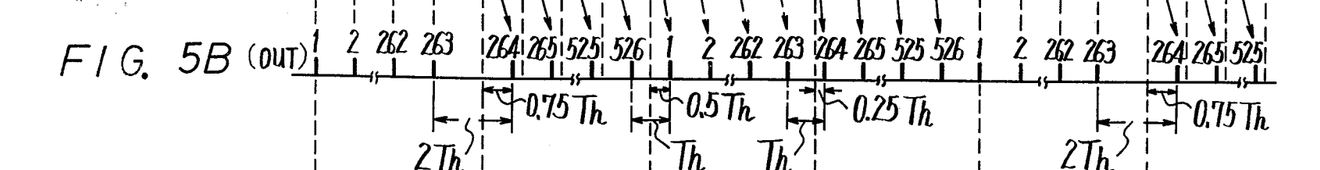
Figure 5C:
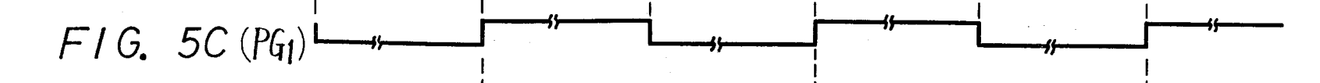
Figure 5D:
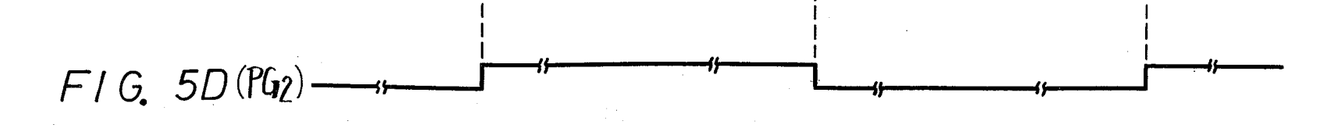

An explanation will now be given on the jumping correcting operation in the case that the record pattern with no H-alignment is still reproduced. If it is assumed that the interval, in which the reproduced output by the head 1A will appear, is taken as $T_{1a}$ and the interval, in which the reproduced output by the head 2A will appear, is taken as $T_{2a}$, the respective intervals succeed alternately and the reproduced video signals including the horizontal synchronizing signals shown in FIG. 5A are supplied to the input terminal 5. The control pulse $PG_1$ has the frame period and also such a phase that it is inverted at a timing just before the first horizontal synchronizing signal after the termination of the interval $T_{1a}$ or $T_{2a}$ as shown in FIG. 5C. While, the control pulse $PG_2$ derived from the ½ frequency divider 15 has the 2-frame period and also such a phase that it is inverted at a timing just before the first horizontal synchronizing signal after the termination of the interval $T_{1a}$ as shown in FIG. 5D.

During the first period $T_{1a}$ in the still reproduction mode, the control pulses $PG_1$ and $PG_2$ are both at the "0" level so that the change-over switches 6 and 8 are both brought to such a connecting state that their input terminals 7a and 9a are respectively connected to their output terminals 7c and 9c with the result that the input video signals are fed, unchanged, to the output terminal 12. During the next period $T_{2a}$, the control pulses $PG_1$ and $PG_2$ both become "1," so that the input terminals 7b and 9b of the change-over switches 6 and 8 are respectively connected to their output terminals 7c and 9c with the result that the video signal delayed by a total of 0.75Th through the cascaded delay lines 3 and 4 is delivered to the output terminal 12. Accordingly, in the output video signal 1.25Th+0.75Th=2Th is established as shown in FIG. 5B, which means that the jumping is corrected.

During the period $T_{1a}$ after the period $T_{2a}$, the control pulse $PG_1$ becomes "0" but the control pulse $PG_2$ is still "1" so that the input terminal 7a of the switch 6 is connected to its output terminal 7c but the switch 8 is still in the above connection state or its input terminal 9b being connected to its output terminal 9c. Thus, the video signal delayed by 0.5Th through the delay line 4 is derived and hence the jumping is corrected as shown in FIG. 5B.

Within the period $T_{2a}$ after the delay of 0.5Th, the control pulse $PG_1$ turns to "1" but the control pulse $PG_2$ turns to "0." Therefore, in the change-over switch 6 its input terminal 7b is connected to the output terminal 7c thereof, while in the change-over switch 8 its input terminal 9a is connected to the output terminal 9c thereof. Thus, the video signal delayed by 0.25Th through the delay line 3 is derived and hence the jumping is corrected. Since the jumping of next 1.25Th can be corrected by the delay of 0.25Th, the control pulses $PG_1$ and $PG_2$ both turn to "0" again. By this manner, the jumping correcting operation with the period of a total of 4 fields, i.e., $T_{1a} \rightarrow T_{2a} \rightarrow T_{1a} \rightarrow T_{2a}$, as set forth above, will be repeated.

It is possible that the jumping correction circuit shown in FIG. 4 does not achieve any jumping correcting operation for the record pattern with the H-alignment. However, when a record pattern with no H-alignment is still-reproduced, the jumping correction circuit of FIG. 4 is required to achieve such a control operation that the four connecting combinations of the two change-over switches 6 and 8 must be present in accordance with a predetermined order, which control is rather troublesome.

Further, according to the circuit of FIG. 4, two delay lines 3 and 4 are required in cascade connection so as to delay the video signal by 0.75Th. The provision of the cascaded delay lines, however, causes an increase in the insertion loss which causes the video signal to deteriorate in quality.

Figure 6:
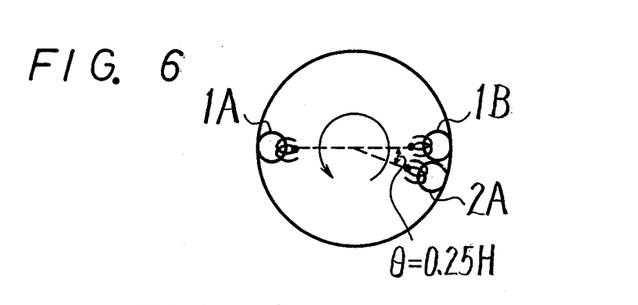
FIG. 6 is a plan view showing an example of the rotary head assembly according to the present invention.

Now, an embodiment of a head arrangement according to this invention which overcomes the above-described problems will be explained with reference to FIG. 6, in which a pair of heads 1A and 1B are arranged to be diametrically opposed and another head 2A is provided at a position where it is shifted from the position of the head 1B by a predetermined angle $\theta$ corresponding to (n+0.25)Th [n: a positive integer] in the rotating direction. It is noted that the azimuth angle of the head 2A is selected to have the same azimuth angle of the head 1A, and the azimuth angle of the head 1A is different from that of the head 1B. In this embodiment, the azimuth angles of the heads 1A and 1B are selected to be +7° and −7°, respectively.

The recording operation is carried out by the pair of heads 1A and 1B, and thereby the two adjacent tracks are formed so as to be longitudinally displaced by a distance equivalent to ¼H along a track, as shown in FIG. 2B. During the normal reproduction, the two adjacent tracks are reproduced by the heads 1A and 1B, respectively, while one of the two adjacent tracks which is recorded with the head 1A is reproduced by the heads 1A and 2A during the still mode reproduction. In case of the still mode reproduction by the heads 1A and 2A, it is apparent that a jumping of the horizontal sync. signal will occur even in the reproduction of the tape pattern having the H-alignment shown in FIG. 3B. However, it should be noted that the jumping can be more easily compensated for in comparison with the circuit of FIG. 4.

Figure 7A:
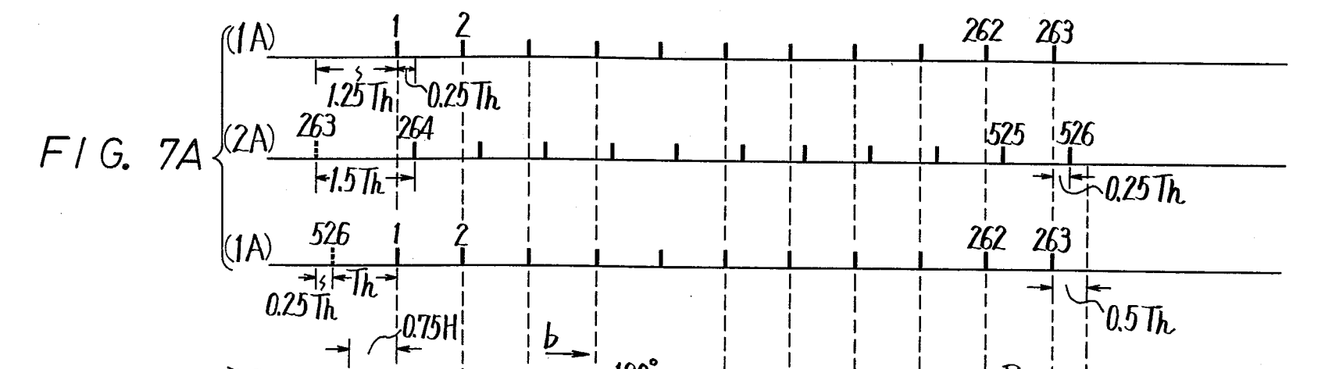
Figure 7B:
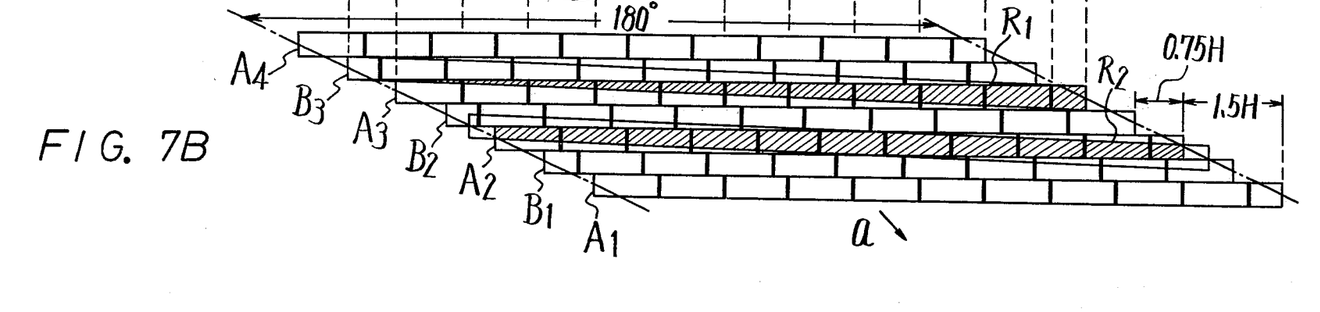

Firstly, the manner of the jumping in the still mode reproduction of the record pattern having no H-alignment will be explained with reference to FIG. 7. When the head 1A scans the portion bridging both tracks B3 and A3 as shown in FIG. 7B, a reproduced video signal including horizontal synchronizing signals with the time relation shown in the upper row of FIG. 7A is produced. Since the head 2A is located in the direction to be apart from the head 1A, when the head 2A scans the record pattern, horizontal synchronizing signals, each being delayed by 0.25Th as compared with each of those reproduced by the head arrangement of 180° angular distance (shown in the middle row of FIG. 7B), are obtained. Therefore, the distance between the 263rd and 264th horizontal synchronizing signals becomes 1.5Th and hence the jumping of 0.5Th is generated.

While, when the reproduced video signal is changed from the head 2A to the head 1A, the distance between the 526th and first horizontal synchronizing signals becomes (1.25−0.25)Th=1Th so that no jumping is generated. As set forth previously, when the reproduced output is changed from that by the head 1A to that by the head 2A, the jumping of 0.5Th is generated, but when the reproduced output is changed from that by the head 2A to that by the head 1A, no jumping occurs.

Figure 8A:
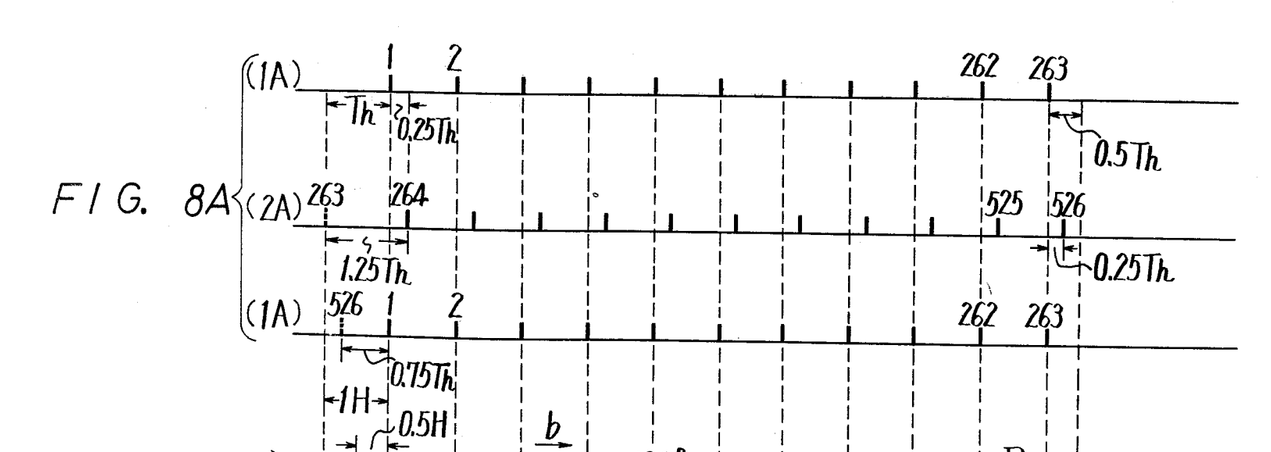
Figure 8B:
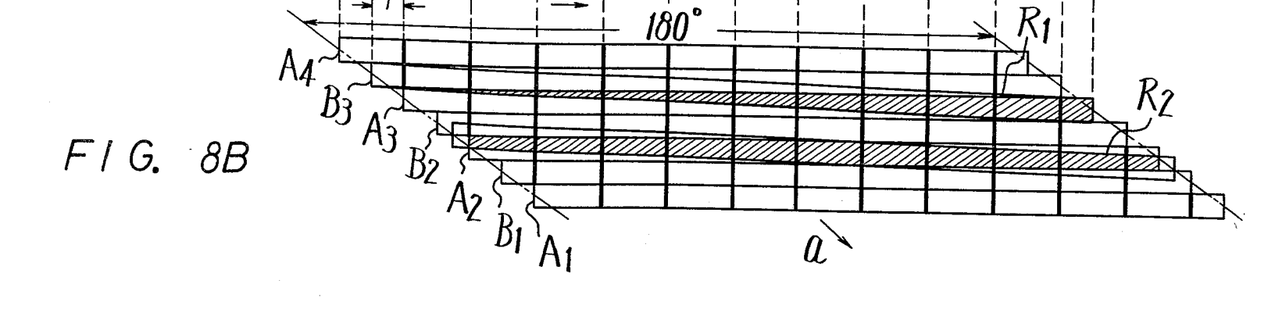

Next, a description will be given of the jumping when the record pattern of the H-alignment shown in FIG. 8B is still-reproduced along a scan trace $R_1$. In such a case, where a reproduced output is derived first from the head 1A and a reproduced output is then derived from the head 2A, the distance between the 263rd and 264th horizontal synchronizing signals becomes 1.25Th and that between the 526th and first horizontal synchronizing signals becomes 0.75Th, as shown in FIG. 8A.

The jumping similar to the above is also generated in the case where the record pattern is still-reproduced along a scan trace $R_2$, as shown in FIGS. 7B and 8B.

Figure 9:
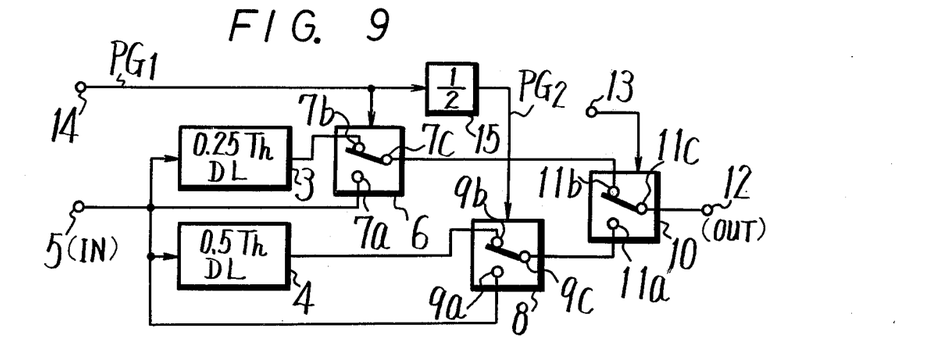
FIG. 9 is a block diagram showing an example of the jumping correction circuit according to the invention.

FIG. 9 shows an example of the jumping correction circuit according to the present invention. With the circuit of FIG. 9, similar to that shown in FIG. 4, a reproduced video signal is fed to an input terminal 5, and between the input and output terminals 5 and 12 there are respectively provided a delay circuit or line 3 of 0.25Th, a delay circuit or line 4 of the 0.5Th, change-over switches 6, 8 and a mode change-over switch 10.

In the circuit of FIG. 9, the delay lines 3 and 4 are connected in parallel to the input terminal 5, and the delayed outputs therefrom are respectively applied to input terminals 7b and 9b of the switches 6 and 8. The other input terminals 7a and 9a of switches 6 and 8 are both supplied with the reproduced video signal from the input terminal 5, and the output terminals 7c and 9c of switches 6 and 8 are respectively connected to input terminals 11b and 11a of the mode change-over switch 10. The change-over switches 6 and 8 are respectively controlled by control pulses $PG_1$ and $PG_2$ in such a manner that when the pulse $PG_1$ is "1" the terminals 7b and 7c of switch 6 are connected to each other, and when the pulse $PG_2$ is "1," the terminals 9b and 9c of switch 8 are connected to each other.

Figures 10A, 10B:
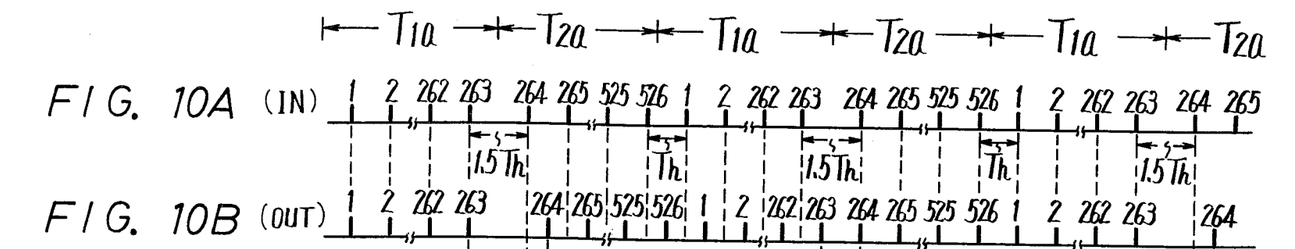
Figure 10C:
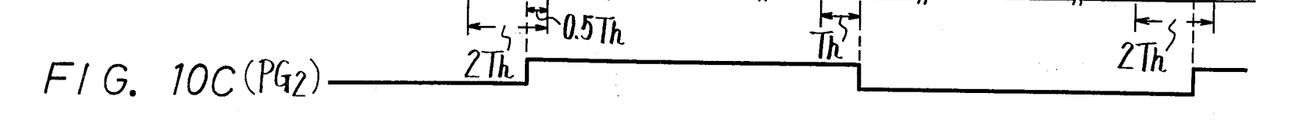

When the record pattern with no H-alignment as shown in FIG. 7B is reproduced in a still mode, the terminals 11a and 11c of the mode change-over switch 10 are connected. At this time, a reproduced video signal including horizontal synchronizing signals having the time relation shown in FIG. 10A is supplied to the input terminal 5. In this reproduced video signal, the distance between the horizontal synchronizing signals in the reproduced output from the head 1A and in that from the head 2A is 1.5Th, as set forth previously. The control pulse $PG_2$ has such a phase that it rises up and falls down just before the 264th horizontal synchronizing signal in the interval $T_{2a}$, as shown in FIG. 10C. Since the change-over switch 8 is so controlled by the control pulse $PG_2$ that when the pulse $PG_2$ is "0" the terminals 9a and 9c of switch 8 are connected, while when the pulse $PG_2$ is "1," the terminals 9b and 9c of switch 8 are connected, in the video signal appearing at the output terminal 12, the distance 1.5Th becomes 2Th or 1Th, as shown in FIG. 10B, which means that the jumping can be corrected.

Figure 11A:
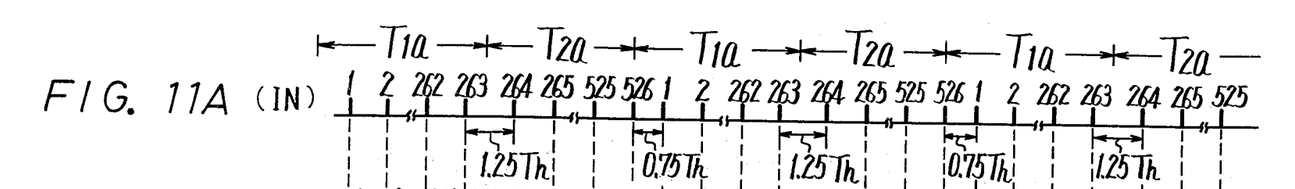
Figure 11B:
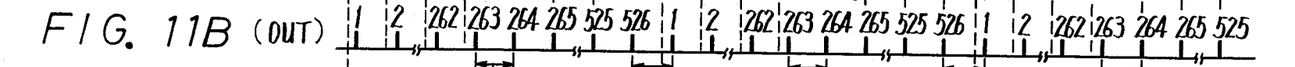
Figure 11C:
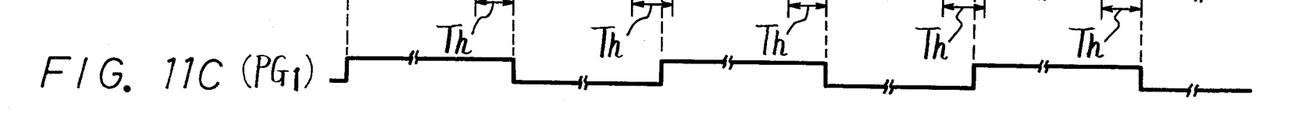

When the record pattern of the H-alignment shown in FIG. 8B is reproduced in a still mode, the terminals 11b and 11c of mode change-over switch 10 are connected. At this time, a reproduced video signal including horizontal synchronizing signals having the time relation shown in FIG. 11A is supplied to the input terminal 5. In this reproduced video signal, the distance between the horizontal synchronizing signals upon the changing-over of the reproduced output from the head 1A to the head 2A is 1.25Th, while that from the head 2A to the head 1A is 0.75Th. In this case, the control pulse $PG_1$ is made to have such a phase that it rises up just before the first horizontal synchronizing signal in the interval $T_{1a}$ and falls down just before the 264th horizontal synchronizing signal in the interval $T_{2a}$, as shown in FIG. 11C. The change-over switch 6 is controlled by the pulse $PG_1$ so that when the pulse $PG_1$ is "0" the terminals 7a and 7c of switch 6 are connected and when the pulse $PG_1$ is "1" the terminals 7b and 7c of the switch 6 are connected. Therefore, as shown in FIG. 11B, in a video signal derived at the output terminal 12, the distances of 1.25Th and 0.75Th in the input video signal are all made 1Th and hence, the jumping correction can be carried out.

As described above, according to the present invention, upon the still mode reproduction of the record pattern with no H-alignment, the jumping can be corrected by such a manner that the state with the delay line 4 of 0.5Th being inserted and the state with no delay line are alternately presented, while upon the still mode reproduction of the record pattern with the H-alignment, the jumping can be corrected by the manner that the state with the delay line 3 of 0.25Th being inserted and the state with no delay line are alternately presented. Therefore, the jumping correction circuit of the invention becomes much easier to control as compared with that of the circuit shown in FIG. 4 and can avoid such a defect that the reproduced video signal deteriorates in quality due to the increase in the insertion loss because two delay lines are not connected in cascade in the circuit of the invention.

In the above-described embodiment, the angular displacement is selected to be 0.25H, but it is apparent that it can be generally selected to be (n+0.25)H [n: a positive integer].

Figure 12:
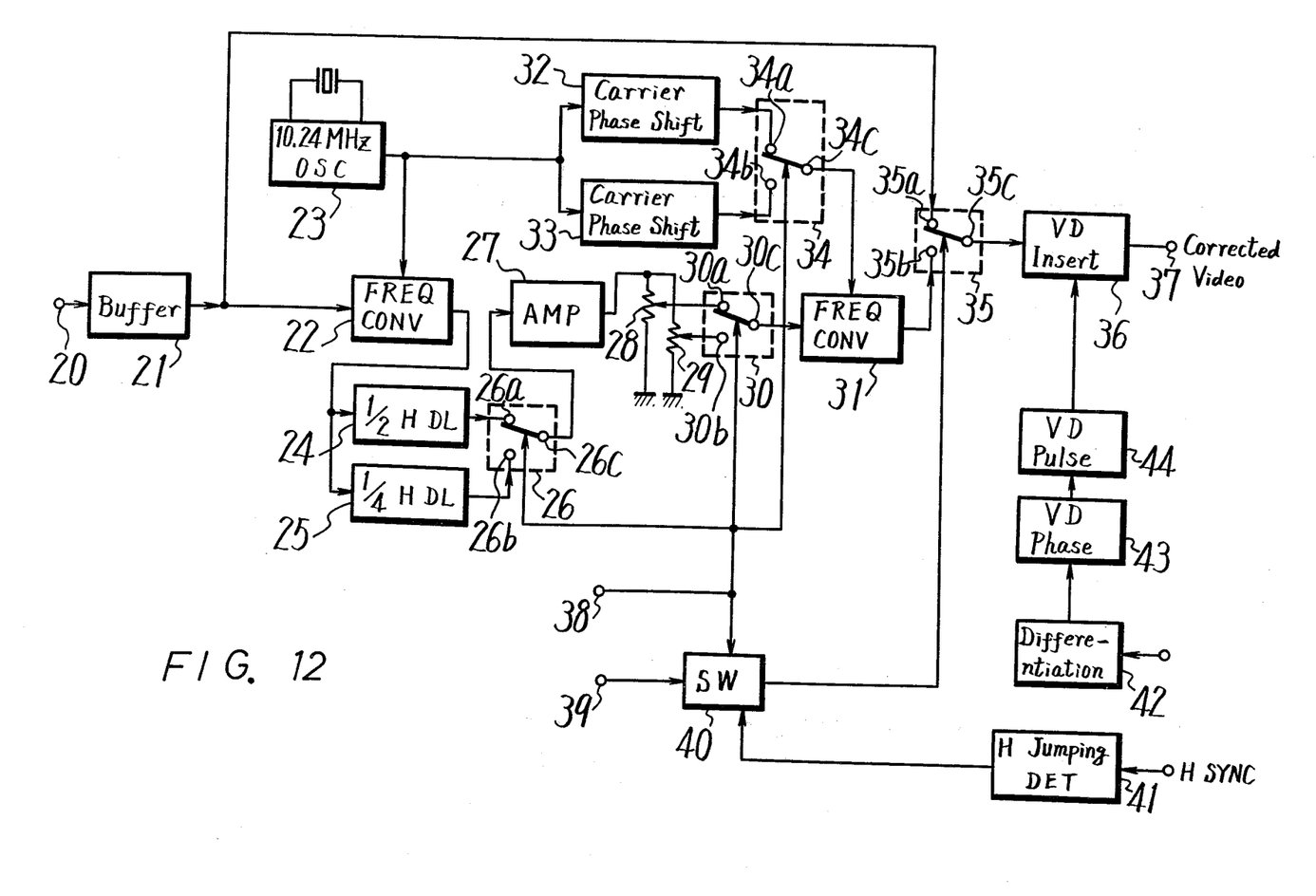
FIG. 12 is a block diagram showing another example of the jumping correction circuit of the invention.

FIG. 12 shows another embodiment of the jumping compensation circuit according to this invention, in which the reproduced video signal is supplied to an input terminal 20 and through a buffer amplifier 21 to a frequency converter 22. The frequency converter 22 is used to amplitude-modulate the video signal with a carrier signal from a reference oscillator 23, and the modulated video signal from the converter 22 is supplied to a pair of delay lines 24 and 25 having the respective delay amounts 0.5H and 0.25H. The video signal is amplitude modulated because a video signal having a relatively wide frequency range from D.C. to the chroma frequency range of 3.58 MHz cannot pass through the delay lines 24 and 25, the pass band of which are limited only in the high frequency range. Accordingly, by modulating the video signal with the carrier of 10.24 MHz, lower side band components of the modulated video signal are able to pass through the delay line having a frequency band of 8 MHz±2 MHz.

Outputs of the delay lines 24 and 25 are connected with fixed terminals 26a and 26b of a first switch 26, and a movable arm 26c thereof is connected by way of amplifier 27 to level adjusters 28 and 29, the outputs of which are connected with fixed terminals 30a and 30b of a second switch 30, respectively. It is noted that the level adjusters 28 and 29 are used to compensate for the level difference between the outputs of the delay lines 24 and 25. Further, a movable arm 30c of the switch 30 is connected with a frequency converter 31, in which the modulated video signal is frequency-demodulated to obtain the original video signal, and to which the carrier signal from the reference oscillator 23 is supplied by way of a phase shifter. The circuit of this invention is provided with two carrier phase shifters 32 and 33 having different phase shift amounts, which correspond to the phase shifters of the video signal in the respective delay lines 24 and 25. The outputs of the phase shifters 32 and 33 are connected to fixed terminals 34a and 34b of a third switch 34 which is changed in synchronism with the switching of the first switch 26.

There is further provided a fourth switch 35 in which the reproduced video signal is fed from the buffer amplifier 21 to a fixed terminal 35a of the switch 35 as it is and the demodulated delay video signal is fed to a fixed terminal 35b thereof. The movable arm 35c of the switch 35 is connected to an output terminal 37 by way of a vertical sync. signal inserting circuit 36 which will be later described in detail. The switch 35 is controlled by the switching signal shown in FIG. 10C during the record pattern of FIG. 7B being reproduced and by the switching signal shown in FIG. 11C during the record pattern of FIG. 8B being reproduced.

On the other hand, the switches 26, 30 and 34 are synchronously changed in response to a mode signal from a terminal 38 such that during the tape pattern of FIG. 7B being reproduced the movable arms 26c, 30c and 34c thereof are connected with the fixed terminals 26a, 30a and 34a, respectively, and during the tape pattern of FIG. 8B being reproduced the movable arms 26c, 30c and 34c thereof are connected with the fixed terminals 26b, 30b and 34b, respectively. A numeral 40 indicates a switching signal generator which produces the switching signal $PG_1$ (FIG. 11C) or $PG_2$ (FIG. 10C), on basis of a pulse signal which is generated by a pulse generator of a drum (not shown) and fed thereto through a terminal 39. It is apparent that the switching signal $PG_1$ or $PG_2$ is selectively supplied in response to the mode signal. It is further noted that the switching signal generator 40 is supplied with another control signal from an H-jumping detector 41 which detects the jumping of the horizontal sync. signal. The control signal is used for changing-over the delay line when the jumping does not happen in synchronism with the head changing signal in slow and fast mode reproductions.

The video signal corrected in the above manner is delayed by 0.25H or 0.5H at every field interval or every second field interval. This causes a vertical jitter on the picture reproduced on a television receiver. In order to avoid the above problem, reference vertical sync. signals VD are inserted into the corrected video signal in the circuit 36. The signal VD is formed by the head switching signal which is first differentiated in a differentiation circuit 42 to obtain a differentiated pulse. The differentiated pulse is delayed by a predetermined amount in a VD phase control circuit 43 in order to determine the position of the VD signal to be inserted. Finally, the VD signal is generated on the basis of the delayed pulse in VD pulse generating circuit 44 and is mixed with the video signal in the circuit 36.

It will be apparent that many modifications and variations can be effected by one skilled in the art without departing from the spirit and or scope of the present invention as defined by the appended claims.

What is claimed is:

1. An apparatus for reproducing video signals recorded in successive parallel tracks extending at an angle to the length of a tape, comprising:
   two main reproducing heads having different azimuth angles with respect to each other and disposed diametrically opposite each other;
   at least one auxiliary reproducing head having the same azimuth angle as one of said main reproducing heads, said auxiliary reproducing head being disposed to be circumferentially displaced by (n+0.25)H' from the other of said main reproducing heads, where n is zero or a positive integer, and H' is an angle corresponding to one horizontal scan line on the tape;
   head control means for controlling said main and auxiliary reproducing heads to reproduce said video signals with said main reproducing heads when the tape is transported lengthwise at a standard speed and to reproduce said video signals alternately with said one of said main reproducing heads and said auxiliary reproducing head when said tape is stopped; and
   delay control means operative when said tape is stopped for relatively delaying the video signal reproduced by said one main reproducing head and the video signal reproduced by said auxiliary reproducing head so as to compensate for any variation in the periodicity of the horizontal synchronizing pulses which occurs upon a change in the reproduction of said video signals by said one of said main reproducing heads and said auxiliary reproducing head.

2. An apparatus according to claim 1 for use with a first type of recording on said tape wherein said horizontal synchronizing pulses of said video signals recorded in adjacent tracks are offset from each other in a direction along said tracks, and a second type of recording on said tape wherein the horizontal synchronizing pulses in said adjacent tracks are aligned with respect to each other; and in which said delay control means includes first delay means for relatively delaying said reproduced video signals by a first delay amount upon reproduction of said first type of recording on said tape and second delay means for relatively delaying said reproduced video signals by a second delay amount upon reproduction of said second type of recording on the tape, said second delay amount differing from said first delay amount.

3. An apparatus according to claim 2, in which said offset of said horizontal synchronizing pulses in nearby tracks is selected to be (n+0.75)Th, where n is zero or a positive integer, and Th is the distance along said track corresponding to one horizontal period, and said first delay means has a delay amount of ½H and said second delay means has a delay amount of ¼H, where H is the length of time for one horizontal period.

4. An apparatus according to claim 3, in which said delay control means further includes a first switching circuit for switching between said first delay means and said second delay means in response to said reproduction of the first and second types of recordings on said tape, and a second switching circuit for selectively providing said reproduced video signals and said delayed video signals from one of said first and second delay means.

5. An apparatus according to claim 4, in which said delay control means includes switch control means operative to switch said second switching circuit at each field interval upon reproduction of said second type of recording on said tape and at every second field interval upon reproduction of said first type of recording on said tape.

6. An apparatus according to claim 2, in which said first and second delay means have a frequency characteristic favoring the passage therethrough of signals in a relatively high frequency range; and said delay control means further comprises frequency converting means connected before and after said first and second delay means, respectively, for increasing said frequency of said reproduced video signals to said high frequency range prior to being supplied thereto, and for decreasing said frequency of said delayed video signals to the original frequency range.

7. An apparatus according to claim 6, in which said frequency converting means further includes an oscillator for generating a carrier signal to be supplied to said frequency converting means, and first and second independently operable phase shifters through which said carrier signal is supplied to said frequency converting means provided after said first and second delay means upon reproduction of said first and second types of recordings on said tape, respectively.

8. An apparatus according to claim 6, in which said delay control means further includes means for inserting a reference vertical sync. signal into said video signal selectively delayed by said first and second delay means.

* * * * *